United States Patent [19]

Yamashita

[11] Patent Number: 4,911,100
[45] Date of Patent: Mar. 27, 1990

[54] DEVELOPING APPARATUS

[75] Inventor: Keitaro Yamashita, Kamisato, Japan

[73] Assignee: Hitachi Metals, Ltd., Tokyo, Japan

[21] Appl. No.: 176,285

[22] Filed: Mar. 31, 1988

[30] Foreign Application Priority Data

Mar. 31, 1987 [JP] Japan ................................ 62-78326

[51] Int. Cl.$^4$ ......................................... G03G 15/09
[52] U.S. Cl. ..................................... 118/658; 355/251
[58] Field of Search ............ 118/657, 658; 355/3 DD, 355/251, 253

[56] References Cited

U.S. PATENT DOCUMENTS

| | | | |
|---|---|---|---|
| 3,909,258 | 9/1975 | Kotz | 118/638 X |
| 3,939,801 | 2/1976 | Tanaka et al. | 118/658 |
| 3,952,701 | 4/1976 | Yamashita et al. | 118/658 |
| 4,030,447 | 6/1977 | Takahashi et al. | 118/658 |
| 4,121,931 | 10/1978 | Nelson | 118/658 X |
| 4,147,127 | 4/1979 | Terashima | 118/658 X |
| 4,254,202 | 3/1981 | Matsumoto et al. | 118/657 X |
| 4,331,100 | 5/1982 | Mochizuki et al. | 118/657 |
| 4,334,772 | 6/1982 | Suzuki | 118/657 X |
| 4,356,245 | 10/1982 | Hosono et al. | 430/106.6 X |
| 4,378,754 | 4/1983 | Rasekhi et al. | 118/658 |
| 4,558,294 | 10/1985 | Yamashita | 118/657 X |
| 4,640,880 | 2/1987 | Kawanishi et al. | 118/657 X |

FOREIGN PATENT DOCUMENTS 52-2440 1/1977 Japan .
53-29569 3/1978 Japan .
55-48754 4/1980 Japan .

Primary Examiner—Shrive Beck
Assistant Examiner—Alain Bashore
Attorney, Agent, or Firm—Finnegan, Henderson, Farabow, Garrett & Dunner

[57] ABSTRACT

A developing apparatus has a rotatable, non-magnetic sleeve positioned opposite to an electrostatic latent image-bearing member moving in one direction; a magnet member having a plurality of magnetic poles, one of which serves as a main magnetic pole positioned in a developing area, and being stationary in the sleeve; and a container for a magnetic developer which is supplied onto the sleeve, the magnet member generating near the main magnetic pole on the sleeve a magnetic attraction force having a circumferential distribution which shows (a) a minimum value $F_1$ near the center of the main magnetic pole and (b) a maximum value $F_2$ downstream of a position at which the image-bearing member is the closest to the sleeve, with respect to the rotational direction of the sleeve.

3 Claims, 3 Drawing Sheets

DEVELOPING APPARATUS

BACKGROUND OF THE INVENTION

The present invention relates to an apparatus for developing electrostatic latent images carried on a photosensitive surface, and more particularly to a developing apparatus the type of using a rotatable sleeve.

In electrostatic latent image developing apparatuses in photocopiers, electrostatic recording apparatuses and the like, electrostatic latent images are formed on an image-bearing surface made from selenium or zinc oxide photosensitive materials, organo-photoconductive materials, etc., developed with magnetic developers by way of a magnetic brush method, and fixed on papers, or transferred to transfer sheets and then fixed.

Widely used as such a developing apparatus is that of the magnetic brush type comprising a rotatable sleeve made of a non-magnetic material for supporting a developer and a magnetic roll having a plurality of magnetic poles and installed within the sleeve.

As magnetic developers for the magnetic brush method, two-component developers consisting of ferromagnetic carriers and toners are widely used. The magnetic carries are iron particles, ferrite particles, nickel particles, etc. which may be coated with organic polymers. The toners are fine resin particles containing coloring pigments or dyes dispersed therein. The carrier and the toner are selected so that they are charged to opposite polarities by friction when mixed and stirred.

The basic structure of the magnetic brush-type developing apparatus remains substantially unchanged in recent years, but various proposals have been made so far to improve the quality of images.

For instance, Japanese Patent Laid-Open No. 50-116042 (U.S. Pat. No. 3,952,701) discloses an electrostatic developing apparatus comprising a main developing magnetic poles and a plurality of magnetic poles of the same polarity opposing each other for bringing a wide magnetic brush into contact with a photosensitive drum uniformly. Japanese Patent Laid-Open No. 51-43151 (U.S. Pat. No. 4,030,447) discloses a developing apparatus comprising a magnet roll having magnetic poles of identical polarity disposed adjacent to each other at positions opposed to the latent image bearing surface. This developing apparatus utilizes a powder cloud phenomenon like cascade in a repulsive magnetic field. And Japanese Patent Laid-Open No. 54-122131 discloses a developing apparatus comprising a single magnet for providing a relatively weak magnetic field and a relatively strong magnetic field to a developing site therein. These developing apparatuses use two-component developer.

In a magnetic brush developing method using two-component developers, only the toner charged at a predetermined polarity due to the friction with carrier is adhered ti an image-bearing surface so that the transfer of a toner image is easy. However, since it is necessary to control the concentration of toner during the developing operation, a toner concentration controlling means is needed, making the structure of the developing apparatus rather complicated.

To eliminate such a problem, recently one-component magnetic toner consisting mainly of a resin and magnetic powder has come to be used as a developer. In the magnetic brush developing method using a magnetic toner, a clear transferred image cannot be obtained by the use of a conductive magnetic toner (U.S. Pat. No. 3,909,258). Thus, insulated (non-conductive) magnetic toner having high electric resistance is widely used nowadays. Nevertheless, the non-conductive magnetic toner is disadvantageous in that good development cannot be achieved, though it is easily transferred onto a plain paper. To overcome this disadvantage, a proposal was made to repeatedly contact the toner with a sleeve or a doctor blade to charge the toner while rapidly rotating at least the sleeve (U.S. Pat. No. 4,121,931). As this developing method uses a non-chargeable magnetic toner, it is generally difficult to charge the toner fully, making it necessary to elevate the surface potential of the photosensitive material. Accordingly, the photosensitive material inevitably has a shortened service life.

Thus, the use of chargeable magnetic toner containing charge-controlling agents was proposed (Japanase Patent Laid-Open No. 55-48754, etc.). A method using this type of toner can be conducted at a surface potential of a photosensitive drum substantially on the same level as when the two-component developer is used. In a case where the chargeable magnetic toner is used, the developing apparatus may have a simple structure so that a sleeve rotation system is widely employed.

And when the chargeable magnetic toner is used, the toner tends to agglomerate by electric charge on a sleeve. Accordingly, to prevent the agglomeration, the use of a developer consisting of a mixture of the chargeable magnetic toner and the magnetic carrier was also proposed (U.S. Pat. No. 4,640,880), and such a developer has been put into practical use. In the case of using such a magnetic developer, a developing apparatus of the sleeve rotation system is advantageous in structural simplicity.

Further in the case of using the above chargeable magnetic toner, a so-called jumping developing method by which an image is developed without bringing the toner into contact with the non-image area of an image-bearing surface unlike in the magnetic brush method was proposed (U.S. Pat. No. 4,356,245), and it is now practically employed. This developing method also uses a sleeve rotation system.

As described above, in a developing apparatus for developing an electrostatic latent image by means of various magnetic developers, the sleeve rotation system is most advantageous as a means of conveying the developer from the aspect of structural simplicity. In the sleeve rotation system, the height of the brush of the developer on the sleeve is greatly affected by the strength and distribution of a magnetic flux on the sleeve as compared with a case where the magnet is rotated. In other words, with only slight unevenness of the magnetic flux and disturbance of the magnetic flux density distribution, the quality of the resulting image deteriorates greatly. For this reason, the magnetic flux density distribution was conventionally determined for each developing condition to enhance the image quality.

However, it has been found that simple evaluation of a magnetic flux density and its distribution in a radial direction which has generally been made so far does not necessarily make it possible to find the conditions of providing the best image quality, and that therefore, the change of these parameters does not necessarily ensure high-quality image.

OBJECT AND SUMMARY OF THE INVENTION

Therefore, an object of the present invention is to provide a developing apparatus of the sleeve rotation system capable of conducting stable development by adjusting a magnetic attraction force together with a magnetic flux density and its distribution.

Paying attention to the magnetic attraction force acting on a magnetic developer supported on a sleeve in the developing apparatus of the sleeve rotation system, the inventor has found that good development can be achieved by restricting this magnetic attraction force to a particular range. The present invention is based on this finding.

Thus, the developing apparatus of the present invention comprises a rotatable, non-magnetic sleeve positioned opposite to an electrostatic latent image-bearing member moving in one direction; a magnet member having a plurality of magnetic poles, one of which serves as a main magnetic pole positioned in a developing area, and being stationary in said sleeve; and a container for a magnetic developer which is supplied onto said sleeve, said magnet member generating near said main magnetic pole on said sleeve a magnetic attraction force which shows (a) a minimum value $F_1$ near the center of said main magnetic pole and (b) a maximum value $F_2$ downstream of a position at which said image-bearing member is the closest to said sleeve, with respect to the rotational direction of said sleeve.

DETAILED DESCRIPTION OF THE PREFERRED EMBODIMENTS

The present invention will be described in detail referring to the attached drawings.

Figure 1:
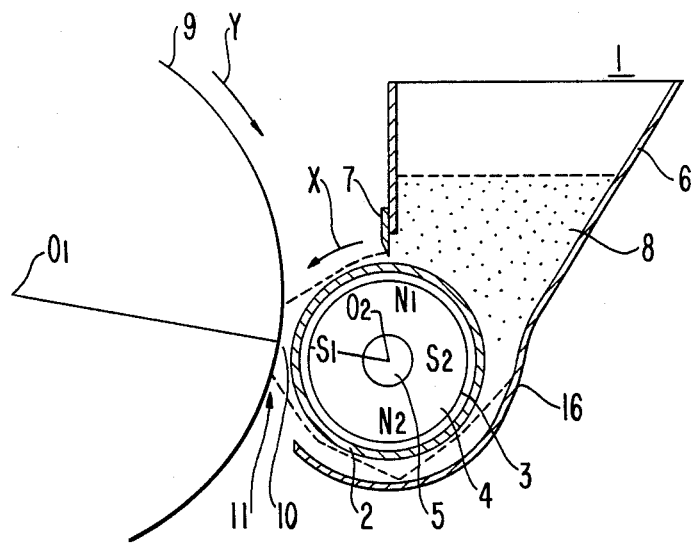
FIG. 1 is a schematic, cross-sectional view of the developing apparatus according to one embodiment of the present invention.

Referring to FIG. 1, a developing apparatus according to one embodiment of the present invention is indicated by a reference numeral "1". The developing apparatus 1 is constituted by a developer container 16, a magnet roll generally indicated by "3", a hopper 6 mounted on a top wall of the container 16 for supplying toner to the container 16. A doctor blade 7 is mounted to the bottom of the hopper 6 to define a gap through which the toner is conveyed onto the sleeve 2.

The magnet roll 3 is constituted by a shaft 5, a permanent magnet 4 secured to the shaft 5 and having a plurality of magnetic poles arranged alternately like N, S, . . . on the surface of the permanent magnet 4, and a non-magnetic sleeve 2. In this embodiment, the magnetic pole are $S_1$, $N_1$, $S_2$ and $N_2$, and $S_1$ serves as a main magnetic pole facing a developing area indicated by a reference numeral "10" in FIG. 1. The other magnetic poles $S_2$, $N_1$, $N_2$ are for conveying magnetic developer 8, which is contained in the hopper 6.

In this embodiment, the permanent magnet 4 is stationary, while the non-magnetic sleeve is rotated as shown by the arrow X.

In the above developing apparatus, the developer 8 attached to the non-magnetic sleeve 2 is conveyed to the developing area 10 with its thickness controlled by the doctor blade 7. In the developing area, the magnetic brush is in slidable contact with a photosensitive drum 9, whereby an electrostatic latent image (not shown) is developed.

In order to conduct good development with the magnetic brush, it is important that in the magnetic brush the developer has a small apparent density, which means the magnetic brush is "soft." To form such a soft magnetic brush, the main magnetic pole $S_1$ should usually be positioned in the vicinity of the developing gap. And to obtain a stable magnetic brush by the magnetic field on the sleeve, the magnetic field should have a gradient in strength, and the magnetic flux distribution on the sleeve affects the shape of the magnetic brush. Thus, an optimum magnetic flux distribution is generally determined so that the peak of the magnetic flux at the main magnetic pole $S_1$ is directed in the direction in which the photosensitive drum and the sleeve are the closest, namely along the line connecting $O_1$ and $O_2$ in the figure, and also by taking into consideration various factors affecting the development such as types and properties of developer used, types of the photosensitive drum, developing speed, peripheral speeds of the sleeve, etc.

As is well known, in the development of electrostatic latent image, one-component magnetic toner particles constituting the developer receive an electrostatic attraction force which is exerted by latent image charges and a magnetic attraction force which magnetically binds the particles onto the sleeve, and when the electrostatic attraction force exceeds the magnetic attraction force, the development begins. Thus, the development characteristics are greatly affected by the magnetic attraction force (hereinafter referred to as "F" in some cases). When F is too large, the toner is less likely to be attracted onto the latent image, necessitating the slowdown of the developing speed. On the other hand, when F is too small, too much toner is attracted, causing a toner fog. Therefore, to control F to an appropriate level, the magnetic flux distribution on the sleeve, usually that in a radial direction, is adjusted.

However, what contributes to the magnetic attraction force is not only a force derived from the magnetic flux (Br) in a radial direction but also a force derived from the magnetic flux Bo in a circumferential direction. More specifically, assuming that the magnet roll has n magnetic poles and that the magnetic flux distribution is in a sine-wave form, Br and Bo at arbitrary point (r,o) apart from the central axis of the magnet roll are expressed as follows;

$$Br = C_1 \cdot \exp[-C_2(r - r_0)] \cdot \cos(n\theta/2)$$

$$Bo = C_1' \cdot \exp[-C_2'(r - r_0)] \cdot \sin(n\theta/2)$$

wherein $r_0$; Radius of magnet roll $C_1$, $C_2$, $C_1'$, $C_2'$: Constant determined by the size and number of magnetic poles of magnet roll Since the magnetic attraction force F applied to a ferromagnetic body of a certain size (having a length between $r_1$ and $r_2$ from the axis) is a combination of the attraction force by Br and that by Bo, it is expressed as follows:

$$F = \frac{Xm \cdot m}{4}[(A - B)\cos n\theta + (A + B)]$$

wherein
Xm: Mass magnetic susceptibility
m: Mass of ferromagnetic body
A: Value of $Br^2(r=r_2) - B^2(r=r_1)$ at position of Br peak
B: Value of $B\theta^2(r=r_2) - B\theta^2(r=r_1)$ at position of $B\theta$ peak Therefore, good development cannot be achieved simply by adjusting the distribution of Br.

As a result of measuring the magnetic attraction force F and evaluating the relation between the distribution of F and the image quality, the inventor has found that there exists a good correlation between the distribution of F and the image quality. Here, the magnetic attraction force was measured by placing iron balls each having a weight of 0.6 mg and a diameter of 0.508 mm around the sleeve with a distance of 0.75 mm between the sleeve surface and the center of each iron ball, and then detecting a force at which the iron ball is attracted to the sleeve.

Figure 2:
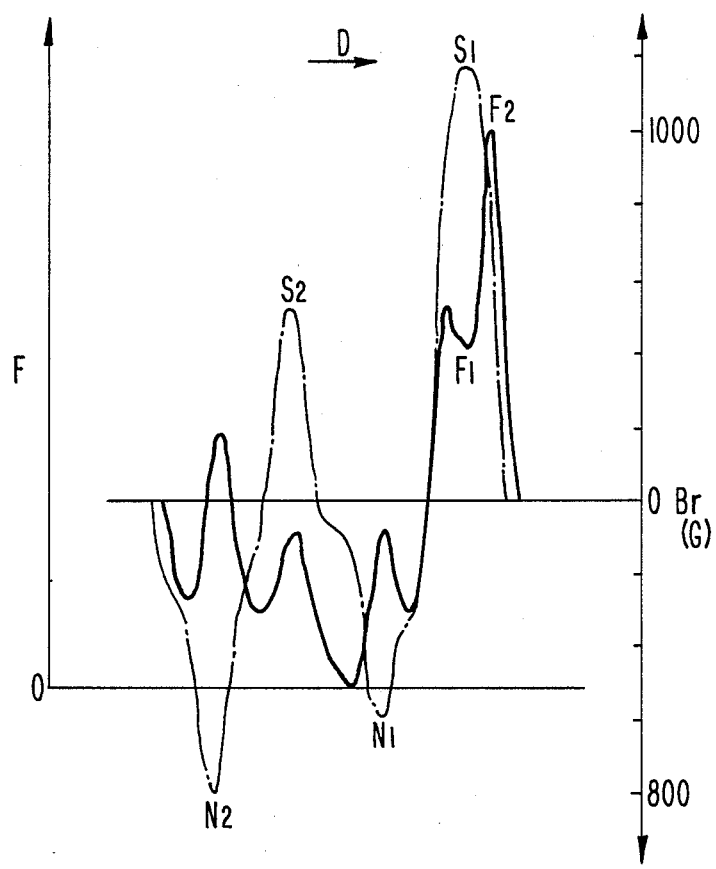
FIG. 2 is a view showing the magnetic flux distribution and magnetic attraction force distribution of a magnetic roll according to the present invention.
Figure 3:
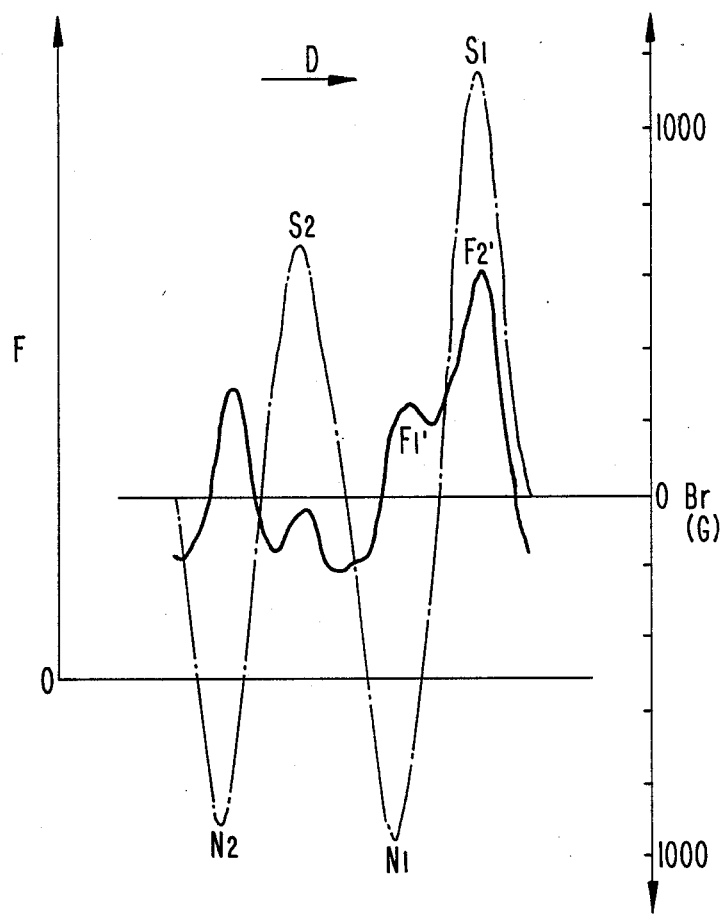
FIG. 3 is a view showing the magnetic flux distribution and magnetic attraction force distribution of a conventional magnetic roll.

FIG. 2 shows a distribution of the magnetic flux (phantom line in the figure) and a distribution of the magnetic attraction force (solid line in the figure) of a magnetic roll provided with four magnetic poles according to the present invention. FIG. 3 shows a magnetic flux distribution (phantom line in the figure) and a magnetic attraction force distribution (solid line is the figure) of a conventional magnet roll. As is clearly shown in FIG. 3, as far as the distribution of F of the conventional magnet roll near the main magnetic pole $S_1$ is concerned, the maximum value $F_2'$ exists near the center of the main magnetic pole $S_1$, with respect to the rotational direction(D) of the sleeve, and the minimum value F' exists nearly at a mid-point between $S_1$ and $N_1$. On the other hand, with respect to the magnet roll of the present invention, the circumferential distribution of F near the $S_1$ pole has the maximum value $F_2$ in a sharp peak on the downstream side of the $S_1$ pole with respect to the rotational direction(D) of the sleeve that is, in the direction from $S_1$ to $N_1$ (see FIG. 1), and the minimum value $F_1$ exists near the circumferential location of the $S_1$ pole. By causing a magnetic brush phenomenon with these magnet rolls, it has been found that the magnet roll of FIG. 2 provides a better image then that of FIG. 3.

Why the magnet roll having a magnetic attraction force distribution as shown in FIG. 2 enables high-quality development has not fully been clarified, but it may be presumed as follows: As in clear from the expression (3), F varies with a period which is double that of the magnetic flux density in a circumferential direction. When (A−B) is positive, the force derived from Br prevails, causing a peak to exist at a magnetic pole, and when (A−B) is negative, the force derived from Bo prevails, causing a peak to exist between magnetic poles. In the case of FIG. 2, F shows the minimum value at the center of the $S_1$ pole, ensuring that the magnetic brush is in soft contact with the photosensitive drum to effect high-quality development. Further, since F shows the maximum value at a position where the contact of the magnetic brush with the photosensitive drum ends, high cleaning effects of the magnetic brush can be obtained, effectively preventing the fogging and the scattering of toner. In the present invention, if $F_2 > F_1$, good development can be achieved, but better results are obtained when $F_2/F_1 \geq 1.5$. This makes it possible to utilize the above effects better. IF $F_2/F_1 < 1.5$, it is likely the scattering of toner toward the vicinity of the resulting image may not be completely avoided.

Incidentally, although the above ratio of attraction forces may have different values depending upon measurement methods, the indispensable requirement of the present invention is to satisfy $F_2/F_1$.

The present invention will be explained in further detail by means of the following Example.

EXAMPLE

A Se drum of 80 mm in outer diameter rotating at a peripheral speed of 150 mm/sec. was uniformly charged at +720 V by a corona discharge unit and then light exposure was conducted to form an electrostatic latent image. This electrostatic latent image was developed by the apparatus as shown in FIG. 1, and the resulting toner image was transferred to a paper by corona discharge, and finally fixing of the toner image was conducted with a heat roll at a temperature of 190° C., fixing line pressure of 1.0 kg/cm and nipping width of 4.0 mm to provide a hard copy.

Figure 4:
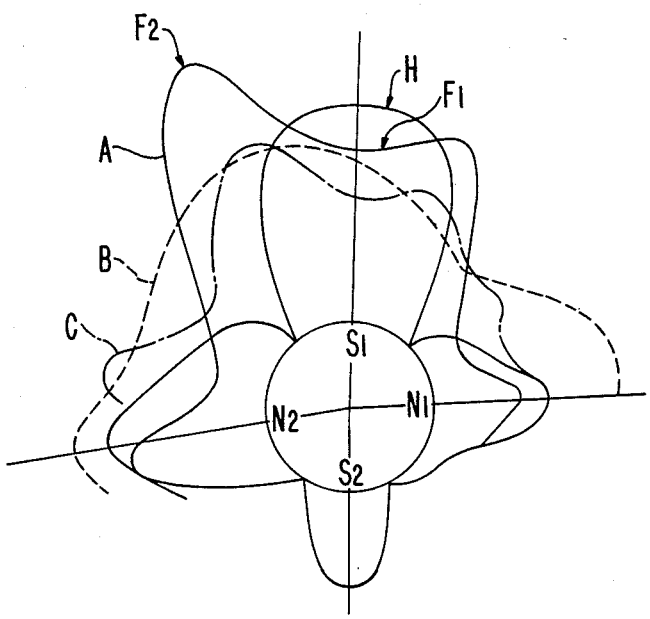
FIG. 4 is a view showing the magnetic attraction force distributions of various magnetic rolls.

In the developing apparatus, the sleeve 2 was made of SUS 304 and had an outer diameter of 20 mm, and the magnet roll 3 was a Ba-ferrite magnet of 18 mm in outer diameter fixed to a shaft. The sleeve was rotated at 200 rpm, and a developing gap was set at 0.3 mm and a doctor gap at 0.4 mm. The magnet roll 3 had four magnetic poles on the surface with equal intervals. Three types of magnet rolls A, B and C were used with different magnetic flux density distributions on the sleeve and different magnetic attraction force distributions. Incidentally, the magnetic attraction force distribution was controlled by changing the magnetization conditions. FIG. 4 shows a magnetic attraction force distribution of each magnet roll and a magnetic flux density distribution (curve H) of magnet roll A in polar coordinates. Incidentally, the magnetic roll A had the same distribution as in FIG. 2.

The developer 10 used in this experiment was a magnetic toner produced as follows: 58 parts by weight of styrene-acrylic copolymer (Highmer SBM 600) manufactured by Sanyo Chemical Co., Ltd.), 40 parts by weight of magnetite (EPT500 manufactured by Toda Kogyo Corp.) and 2 part by weight of a negative charge controlling agent (BONTRON E81 manufactured by Orient Chemical Industries Ltd.) were dry-mixed and blended while heating by a kneeder. The resulting blend was cooled and solidified and then pulverized by a jet mill to particles of 20 μm or less. The particles were charged into a super mixer and mixed with 0.5 part by weight of fine silica powder (R972 manufactured by Nippon Aerosil KK). The mixed powder was heat-treated in a hot air stream at 120° C. and then classified to provide a magnetic toner having a particle size distribution of 5–20 μm. This magnetic toner had a triboelectric charge of −10 μc/g and a resistivity of $5 \cdot 10^{14}$ Ω.cm.

Incidentally, the triboelectric charge was measured by rotating 10 g of carrier (Z200 manufactured by Nippon Teppun K.K.) and 0.5 g of the toner in a plastic container for 10 minutes, collecting 200 mg of a sample from the resulting mixture, introducing the sample into a container equipped with a 325-mesh sieve and measuring by means of a blow-off triboelectric charge detector (TB200 manufactured by Toshiba chemical Corp.). And the resistivity was measured by detecting the resistance of a sample (several 10 mg) contained in a hollow cylinder made of Teflon (tradename) and having an inner diameter of 3.05 mm which was produced by modifying dial gauge, by means of an insulation resistance measurement apparatus (4329A manufactured by Yokokawa-Hewlett-Packard, Ltd.) under a load of 100 g and in a DC electric field of 4 kV/cm.

The evaluation of the imaged obtained under the above conditions is shown in Table 1.

TABLE 1

| Magnet Roll | $F_2F_1$ | Image Quality | | |
|---|---|---|---|---|
| | | Density | Resolution* | Fog |
| A | 1.7 | 1.4 | 8.0 | 0.05 |
| B | 1.6 | 1.4 | 6.3 | 0.10 |
| c | 0.9 | 1.3 | 4.0 | 0.25 |

Note:
*Number of lines in one mm which can be see separately.

Table 1 shows that the magnet roll A having a magnetic attraction force satisfying the requirements of the present invention provides higher-quality image then the other magnet rolls B,C.

In the above Example, explanation has been made in connection with the magnetic brush developing apparatus, but it should be noted that the present invention is also applicable to a developing apparatus utilizing a jumping development. Specifically, in the jumping development, the toner is attracted to a photosensitive member so that it stands up like a "brush" in the developing area. Since the toner receives a Coulomb force and a magnetic attraction force, the above theory is fully applicable. And with respect to the developer, it is not restricted to a magnetic toner, but it may be a two-component developer consisting of a non-magnetic or magnetic toner and a magnetic carrier.

The magnetic attraction force distribution of a magnet roll can be controlled not only by the above magnetization conditions but also by modifying the structure of the magnet roll. For instance, a magnet roll having a magnetic pole which is much stronger than the other magnetic poles as shown in Japanese Utility Model Laid-Open No. 52-2440, and a cylindrical magnet roll consisting of a plurality of magnet blocks adhered to each other as shown in U.S. Pat. No. 4,558,294, etc. may be used.

According to the present invention, good development can be achieved because a magnet roll constituting a developing apparatus has a particularly controlled magnetic attraction force.

What is claimed is:

1. A developing apparatus comprising a rotatable, non-magnetic sleeve positioned opposite to, and forming a developing area with, an electrostatic latent image-bearing member moving in one direction; a magnet member having a plurality of magnetic poles one of which serves as a main magnetic pole positioned in the developing area, and being stationary in said sleeve; and a container for a magnetic developer which is supplied onto said sleeve, said magnet member generating near said main magnetic pole on said sleeve a magnetic attraction force having a circumferential distribution which shows (a) a minimum value $F_1$ near the circumferential location of said main magnetic pole and (b) a maximum value $F_2$ circumferentially downstream of a position at which said image-bearing member is the closest to said sleeve, said downstream circumferential direction being with respect to the rotational direction of said sleeve.

2. The developing apparatus according to claim 1, of the type wherein said magnetic developer forms a magnetic brush on said sleeve.

3. The developing apparatus according to claim 1, wherein the ratio $F_2/F_1$ is greater than or equal to about 1.5.

* * * * *